(12) United States Patent
Kotecha et al.

(10) Patent No.: US 10,637,547 B2
(45) Date of Patent: *Apr. 28, 2020

(54) MIMO PRECODING ENABLING SPATIAL MULTIPLEXING, POWER ALLOCATION AND ADAPTIVE MODULATION AND CODING

(71) Applicant: Apple Inc., Cupertino, CA (US)

(72) Inventors: Jayesh H. Kotecha, Austin, TX (US); Kaibin Huang, Seoul (KR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,373

(22) Filed: Feb. 12, 2019

(65) Prior Publication Data
US 2019/0173540 A1 Jun. 6, 2019

Related U.S. Application Data

(60) Division of application No. 15/468,814, filed on Mar. 24, 2017, now Pat. No. 10,230,438, which is a
(Continued)

(51) Int. Cl.
*H04B 7/06* (2006.01)
*H04B 7/0456* (2017.01)
(Continued)

(52) U.S. Cl.
CPC ........... *H04B 7/0478* (2013.01); *H04B 7/043* (2013.01); *H04B 7/0417* (2013.01); *H04B 7/0447* (2013.01); *H04B 7/0632* (2013.01); *H04B 7/0634* (2013.01); *H04B 7/0639* (2013.01); *H04L 1/0693* (2013.01);
(Continued)

(58) Field of Classification Search
CPC .... H04B 7/0478; H04B 7/0632; H04B 7/043; H04B 7/0447; H04B 7/0634; H04B 7/0639; H04B 7/0417; H04W 52/08; H04L 1/0693; H04L 1/0003; H04L 1/0009

See application file for complete search history.

(56) References Cited

U.S. PATENT DOCUMENTS 5,909,649 A   6/1999   Saunders
6,473,467 B1  10/2002  Wallace et al.
(Continued)

OTHER PUBLICATIONS

B. Clerckx, Space-Time Signaling for Real-World MIMO Channels, Sep. 2005.
(Continued)

*Primary Examiner* — Kenneth T Lam
(74) *Attorney, Agent, or Firm* — Kowert, Hood, Munyon, Rankin & Goetzel, P.C.

(57) ABSTRACT

In a closed-loop wireless communication system, a codebook-based feedback mechanism is provided to enable non-unitary precoding for multi-stream transmission, where in each stream is optimized with suitable transmission power allocation and AMC. The codebook-based feedback mechanism uses a precoding codebook having a power allocation matrix which is constrained to specify that beamforming always applies full power to a predetermined beam. With this constraint, a one-bit power allocation feedback index may be used to switch between beamforming and spatial multiplexing.

20 Claims, 6 Drawing Sheets

Related U.S. Application Data continuation of application No. 14/500,870, filed on Sep. 29, 2014, now Pat. No. 9,608,704, which is a continuation of application No. 13/556,124, filed on Jul. 23, 2012, now Pat. No. 9,154,202, which is a continuation of application No. 12/762,013, filed on Apr. 16, 2010, now Pat. No. 8,229,019, which is a continuation of application No. 11/537,902, filed on Oct. 2, 2006, now Pat. No. 7,702,029.

(51) Int. Cl.
| | |
|---|---|
| *H04B 7/0426* | (2017.01) |
| *H04L 1/06* | (2006.01) |
| *H04B 7/0417* | (2017.01) |
| *H04W 52/08* | (2009.01) |
| *H04L 1/00* | (2006.01) |

(52) U.S. Cl.
CPC ........... *H04W 52/08* (2013.01); *H04L 1/0003* (2013.01); *H04L 1/0009* (2013.01)

(56) References Cited

U.S. PATENT DOCUMENTS

| | | | |
|---|---|---|---|
| 6,968,092 B1 | 11/2005 | Winger | |
| 7,110,463 B2 | 9/2006 | Wallace et al. | |
| 7,139,328 B2 | 11/2006 | Thomas et al. | |
| 7,151,809 B2 | 12/2006 | Wallace et al. | |
| 7,164,649 B2 | 1/2007 | Walton et al. | |
| 7,602,837 B2 | 10/2009 | Kotecha et al. | |
| 7,676,007 B1* | 3/2010 | Choi .................. | H04B 7/0617 375/267 |
| 7,702,029 B2* | 4/2010 | Kotecha ............... | H04B 7/0417 375/267 |
| 8,229,019 B2 | 7/2012 | Kotecha et al. | |
| 2004/0066761 A1 | 4/2004 | Giannakis et al. | |
| 2004/0076224 A1 | 4/2004 | Onggosanusi et al. | |
| 2004/0108944 A1* | 6/2004 | Lee ..................... | H03M 7/3082 341/50 |
| 2005/0009476 A1 | 1/2005 | Wo et al. | |
| 2005/0043031 A1* | 2/2005 | Cho .................... | H04B 7/0413 455/450 |
| 2005/0101259 A1 | 5/2005 | Tong | |
| 2005/0117660 A1* | 6/2005 | Vialle ................. | H04B 1/7115 375/299 |
| 2005/0129137 A1* | 6/2005 | Yamada ............... | H04B 7/0417 375/267 |
| 2005/0201296 A1 | 9/2005 | Vannithamby et al. | |
| 2006/0072677 A1 | 4/2006 | Kwak et al. | |
| 2006/0092054 A1 | 5/2006 | Li et al. | |
| 2006/0093065 A1* | 5/2006 | Thomas ............... | H04B 7/0426 375/299 |
| 2006/0121946 A1 | 6/2006 | Walton et al. | |
| 2006/0155534 A1 | 7/2006 | Lin et al. | |
| 2006/0155798 A1 | 7/2006 | Ketchum et al. | |
| 2006/0171295 A1* | 8/2006 | Ihm ...................... | H04L 5/0046 370/208 |
| 2007/0066571 A1 | 3/2007 | Stockel et al. | |
| 2007/0070967 A1 | 3/2007 | Yang et al. | |
| 2007/0071147 A1 | 3/2007 | Sampath et al. | |
| 2007/0098106 A1* | 5/2007 | Khojastepour ........... | H04L 1/06 375/267 |
| 2007/0099571 A1 | 5/2007 | Withers, Jr. et al. | |
| 2007/0127608 A1 | 6/2007 | Scheim et al. | |
| 2007/0147535 A1 | 6/2007 | Niu et al. | |
| 2007/0160156 A1 | 7/2007 | Melzer et al. | |
| 2007/0223619 A1 | 9/2007 | Lee et al. | |
| 2007/0249296 A1 | 10/2007 | Howard et al. | |
| 2007/0286304 A1 | 12/2007 | Kim et al. | |
| 2008/0013644 A1 | 1/2008 | Hugl et al. | |
| 2008/0056414 A1 | 3/2008 | Kim et al. | |
| 2008/0075058 A1 | 3/2008 | Mundarath et al. | |
| 2008/0076370 A1 | 3/2008 | Kotecha et al. | |
| 2008/0080449 A1 | 4/2008 | Huang et al. | |
| 2008/0080459 A1 | 4/2008 | Kotecha | |
| 2009/0190688 A1 | 7/2009 | Kotecha et al. | |
| 2009/0316802 A1 | 12/2009 | Tong et al. | |
| 2011/0122971 A1 | 5/2011 | Kim et al. | |

OTHER PUBLICATIONS

R.F.H. Fischer et al., "A New Loading Algorithm for Discrete Multitone Transmission," IEEE 1996.
A. Goldsmith et al., "Variable-Rate Variable-Power MQAM for Fading Channels," IEEE Transactions on Communications, vol. 45, No. 10, Oct. 1997.
A. Goldsmith et al., "Adaptive Coded Modulation for Fading Channels," IEEE Transactions on Communications, vol. 46, No. 5, May 1998.
Z. Hong et al., "Spatial Multiplexing in Correlated Fading via the Virtual Channel Representation," IEEE Journal on Selected Areas in Communications, Jun. 2003.
N. Khajehnouri et al., "A Minimum Co-User Interference Approach for Multi-User MIMO Downlink Preceding," ICASSP 2006.
M. Vu et al., "MIMO Wireless Preceding," www.stanford.edu/-mhv/SPM_MIMO_ Wireless_Precoding.pdf, Feb. 2006.
S. Kim et al., U.S. Appl. No. 60/841,246, filed Aug. 31, 2006.
S.V. Bana et al., "Space Division Multiple Access (SDMA) for Robust Ad hoc Vehicle Communication Networks," The IEEE Fourth International Conference on Intelligent Transportation Systems, 2001 IEEE Intelligent Transportation Systems.
D.J. Love et al., "Grassmannian Beamforming on Correlated MIMO Channels," IEEE Global Telecommunications Conference, Nov. 3-Dec. 3, 2004.
A. Bourdoux et al., "Joint TX-RX Optimisation for MIMO-SDMA Based on a Null-space Constraint," 2002 IEEE 56th Vehicular Technology Conference.
D.J. Love et al., "Grassmannian Beamforming for Multiple-Input Multiple-Output Wireless Systems," IEEE, 2003.
A.F. Naguib et al., Performance of Wireless CDMA with M-ary Orthogonal Modulation and Cell Site Antenna Arrays, IEEE, Journal on Selected Areas in Communications, vol. 14, No. 9, Dec. 1996.
L. Dong et al., "Opportunistic Transmission Scheduling for Multiuser MIMO Systems," IEEE, 2003.
H. Shin et al., "Closed-form Formulas for Ergodic Capacity of MIMO Rayleigh Fading Channels," IEEE, 2003.
M. Torlak et al., "Fast Estimation of Weight Vectors to Optimize Multi-Transmitter Broadcast Channel Capacity," IEEE Transactions on Signal Processing, vol. 46, No. 1, Jan. 1998.
V. Zaharov et al., "Smart Antenna Application for Satellite Communication Systems with Space Division Multiple Access," Journal of Radio Electronics, N. 2, Feb. 5, 2001, printed Oct. 18, 2005.
M. Cooper et al., "Intelligent Antennas: Spatial Division Multiple Access," 1996 Annual Review of Communications.
G.J. Foschini et al., On Limits of Wireless Communication in a Fading Environment when Using Multiple Antennas, Wireless Personal Communications, vol. 6, 1998, pp. 311-335, http://www1.belllabs.com/projectlblastlwpc-v6n3.pdf.
R. Monzingo et al., Introduction to Adaptive Arrays, Chapter 3, John Wiley & Sons, 1980, pp. 78-151.
U.S. Appl. No. 11/254,392, filed Oct. 20, 2005, Notice of Allowance dated Sep. 18, 2008.
U.S. Appl. No. 11/254,392, filed Oct. 20, 2005, RCE IDS filed Dec. 16, 2008.
U.S. Appl. No. 11/254,392, filed Oct. 20, 2005, Notice of Allowance dated Jan. 5, 2009.
U.S. Appl. No. 11/254,392, filed Oct. 20, 2005, RCE Amendment filed Apr. 6, 2009.
U.S. Appl. No. 11/254,392, filed Oct. 20, 2005, Notice of Allowance dated Jun. 4, 2009.
U.S. Appl. No. 12/419,701, filed Apr. 7, 2009, Preliminary Amendment dated Apr. 7, 2009.

(56) References Cited

OTHER PUBLICATIONS

D. Love, "Limited Feedback Unitary Precoding for Spatial Multiplexing Systems," IEEE Transactions on Information Theory, vol. 51, No. 8, Aug. 2005.

A. Goldsmith, "The Capacity of Downlink Fading Channels with Variable Rate and Power," IEEE Transactions on Vehicular Technology, vol. 46, No. 3, Aug. 1997.

K. Huang et al., "Effect of Feedback Delay on Limited Feedback for Temporally Correlated Channels," Jul. 2006.

K. Huang et al., "Joint Beamforming and Scheduling for SDMA Systems with Limited Feedback," Jun. 2006.

K. Huang et al., "Limited Feedback for Temporally-Correlated Channels-Feedback Rate and Delay," Mar. or Jun. 2006.

K. Huang et al., "Markov models for multi-antenna limited feedback systems," Jun. 2006.

K. Huang et al., "Multi-Antenna Limited Feedback for Temporally-Correlated Channels Feedback Compression," Jul. 2006.

K. Huang et al., "Orthogonal Beamforming in SDMA Downlink with Limited Feedback," Jul. 2006.

D. Love et al., "Feedback Methods for Multiple-Input Multiple-Output Wireless Systems," 2004.

P. Chow, "A Practical Discrete Multi-tone Transceiver Loading Algorithm for Data Transmission over Spectrally Shaped Channels," IEEE Transactions on Communications, vol. 43, No. 2/3/4, Feb./Mar./Apr. 1995.

R. Fischer et al., "A New Loading Algorithm for Discrete Multitone Transmission," Global Telecommunications Conference, GLOBECOM, 1996.

P. Xia et al., "Multi antenna Adaptive Modulation with Beamforming Based on Bandwidth-Constrained Feedback," IEEE Transactions on Communications, vol. 53, No. 3, Mar. 2005.

U.S. Appl. No. 11/536,280, filed Sep. 28, 2006, Office Action dated Apr. 30, 2009.

U.S. Appl. No. 11/536,280, filed Sep. 28, 2006, Response filed Jul. 30, 2009.

U.S. Appl. No. 11/536,280, filed Sep. 28, 2006, Office Action dated Nov. 5, 2009.

U.S. Appl. No. 11/536,280, filed Sep. 29, 2006, Response filed Feb. 5, 2010.

U.S. Appl. No. 11/536,280, filed Sep. 28, 2006, Office Action dated Apr. 27, 2010.

U.S. Appl. No. 11/536,280, filed Sep. 28, 2006, Pre-Appeal Brief filed Jul. 27, 2010.

U.S. Appl. No. 11/536,280, filed Sep. 28, 2006, Notice of Panel Decision dated Aug. 19, 2010.

U.S. Appl. No. 11/536,280, filed Sep. 28, 2006, Notice of Allowance dated Aug. 30, 2010.

U.S. Appl. No. 11/536,280, filed Sep. 28, 2006, Request for Continued Examination filed Nov. 30, 2010.

B. Banister et al., "A Simple Gradient Sign Algorithm for Transmit Antenna Weight Adaptation with Feedback," IEEE Transactions on Signal Processing, vol. 51, No. 5, May 2003.

* cited by examiner

MIMO PRECODING ENABLING SPATIAL MULTIPLEXING, POWER ALLOCATION AND ADAPTIVE MODULATION AND CODING

PRIORITY CLAIM

This application is a divisional application of and claims the benefit of priority from U.S. patent application Ser. No. 15/468,814, entitled "MIMO Precoding Enabling Spatial Multiplexing, Power Allocation and Adaptive Modulation and Coding" and filed on Mar. 24, 2017, which is a continuation of and claims the benefit of priority from U.S. patent application Ser. No. 14/500,870, entitled "MIMO Precoding Enabling Spatial Multiplexing, Power Allocation and Adaptive Modulation and Coding" and filed on Sep. 29, 2014 (now U.S. Pat. No. 9,608,704), which is a continuation of U.S. patent application Ser. No. 13/556,124, entitled "MIMO Precoding Enabling Spatial Multiplexing, Power Allocation and Adaptive Modulation and Coding" and filed on Jul. 23, 2012 (now U.S. Pat. No. 9,154,202), which is a continuation of and claims the benefit of priority from U.S. patent application Ser. No. 12/762,013, entitled "MIMO Precoding Enabling Spatial Multiplexing, Power Allocation and Adaptive Modulation and Coding" and filed on Apr. 16, 2010 (now U.S. Pat. No. 8,229,019), which is a continuation of and claims the benefit of priority from U.S. patent application Ser. No. 11/537,902, entitled "MIMO Precoding Enabling Spatial Multiplexing, Power Allocation and Adaptive Modulation and Coding" and filed on Oct. 2, 2006 (issued as U.S. Pat. No. 7,702,029), all of which are fully incorporated herein by reference for all purposes and to the extent not inconsistent with this application.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications."

BACKGROUND OF THE INVENTION

Field of the Invention

The present invention is directed in general to field of information processing. In one aspect, the present invention relates to a system and method for precoding feedback in MIMO communication systems.

Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. For example, space division multiple access (SDMA) systems can be implemented as closed-loop systems to improve spectrum usage efficiency. SDMA has recently emerged as a popular technique for the next generation communication systems. SDMA based methods have been adopted in several current emerging standards such as IEEE 802.16 and the 3rd Generation Partnership Project (3GPP) Long Term Evolution (LTE) platform.

FIG. 1 depicts a MIMO wireless communication system 100 in which a transmitter 102 having a first antenna array 106 communicates with receiver 104 having a second antenna array 108, where each antenna array includes one or more antennas. The communication system 100 may be any type of wireless communication system, including but not limited to a MIMO system, SDMA system, CDMA system, OFDMA system, OFDM system, etc. In the communication system 100, the transmitter 102 may act as a base station, while the receiver 104 acts as a subscriber station, which can be virtually any type of wireless one-way or two-way communication device such as a cellular telephone, wireless equipped computer system, and wireless personal digital assistant. Of course, the receiver/subscriber station 104 can also transmits signals which are received by the transmitter/base station 102. The signals communicated between transmitter 102 and receiver 104 can include voice, data, electronic mail, video, and other data, voice, and video signals. In operation, the transmitter 102 transmits a signal data stream (e.g., signal $s_1$) through one or more antennas 106 and over a channel $H_1$ to a receiver 104, which combines the received signal from one or more receive antennas 108 to reconstruct the transmitted data. To transmit the signal $s_1$, the transmitter 102 prepares a transmission signal, represented by the vector $x_1$, for the signal $s_1$. (Note: lower case bold variables indicate vectors and upper case BOLD variables indicate matrices). The transmission signal vector $x_1$ is transmitted via a channel represented by a channel matrix $H_1$, and is received at the receiver 104 as a receive signal vector $y_1 = H_1 x_1 + n_1$ (where n represents co-channel interference or noise). The channel matrix $H_1$ represents a channel gain between the transmitter antenna array 106 and the subscriber station antenna array 108. Thus, the channel matrix $H_1$ can be represented by a k×N matrix of complex coefficients, where N is the number of antennas in the base station antenna array 106 and k is the number of antennas in the subscriber station antenna array 108. The value of k can be unique for each subscriber station. As will be appreciated, the channel matrix $H_1$ can instead be represented by a N×k matrix of complex coefficients, in which case the matrix manipulation algorithms are adjusted accordingly so that, for example, the right singular vector calculation on a k×N channel matrix becomes a left singular vector calculation on a N×k channel matrix. The coefficients of the channel matrix $H_1$ depend, at least in part, on the transmission characteristics of the medium, such as air, through which a signal is transmitted. A variety of methods may be used at the receiver to determine the channel matrix $H_1$ coefficients, such as transmitting a known pilot signal to a receiver so that the receiver, knowing the pilot signal, can estimate the coefficients of the channel matrix $H_1$ using well-known pilot estimation techniques. Alternatively, when the channel between the transmitter and receiver are reciprocal in both directions, the actual channel matrix $H_1$ is known to the receiver and may also be known to the transmitter.

While the benefits of MIMO are realizable when the receiver 104 alone knows the communication channel, these benefits are further enhanced in "closed-loop" MIMO systems when the transmitter 102 has some level of knowledge concerning the channel response between each transmit antenna element and each receive antenna element. Precoding systems provide an example application of closed-loop systems which exploit channel-side information at the transmitter ("CSIT"). With precoding systems, CSIT can be used with a variety of communication techniques to operate on the transmit signal before transmitting from the transmit antenna array 106. For example, precoding techniques can provide a multi-mode beamformer function to optimally match the input signal on one side to the channel on the other side. In situations where channel conditions are unstable or unknown, open loop MIMO techniques such as spatial multiplexing can be used. However, when the channel conditions can be provided to the transmitter, closed loop MIMO methods such as precoding can be used. Precoding techniques may be used to decouple the transmit signal into orthogonal spatial stream/beams, and additionally may be used to send more power along the beams where the channel is strong, but less or no power along the weak, thus enhancing system performance by improving data rates and link reliability. In addition to multi-stream transmission and power allocation techniques, adaptive modulation and coding (AMC) techniques can use CSIT to operate on the transmit signal before transmission on the array 106.

Conventional precoded MIMO systems may obtain full broadband channel knowledge at the transmitter 102 by using uplink sounding techniques (e.g., with Time Division Duplexing (TDD) systems). Alternatively, channel feedback techniques can be used with MIMO systems (e.g., with TDD or Frequency Division Duplexing (FDD) systems) to feed back channel information to the transmitter 102. One way of implementing precoding over a low rate feedback channel is to use codebook-based precoding to reduce the amount of feedback as compared to full channel feedback. However, such precoding feedback can introduce delay when transmission-related decisions (such as whether to use spatial multiplexing or beamforming, i.e., multi-stream or single stream transmission, or whether to use open loop or closed loop transmission) are made at the transmitter only after receiving the channel information feedback signal and/or when the transmission-related decisions are made in the upper software layers (e.g., the MAC layer) of the transmitter 102. In addition, the quantization techniques used in existing codebook systems to compress the channel feedback information can introduce errors in the feedback signal. Moreover, the limited feedback resources require that any practical system be designed to have a low feedback rate, and existing codebook systems can have unacceptably high feedback data rates. This may be illustrated with the example of a MIMO system 100 having a four-antenna transmit array 106 and a two-antenna receive array 108, where a unitary precoding matrix W and a non-unitary power allocation precoding matrix D (not shown) are applied at the transmitter 102 to precode the transmit signal vector $s_1$ (such that $x_1 = WD\ s_1$). With such a system that is used to provide both spatial multiplexing and beamforming, the power allocation values $d_1$, $d_2$ of the non-unitary precoding matrix $$D = \begin{bmatrix} d_1 & 0 \\ 0 & d_2 \end{bmatrix}$$

are each selected from the set of $\{0, 1, \frac{1}{2}\}$, and each power allocation value is represented by a two-bit feedback value to choose from the set of three possible values. The two-bit feedback allows each of the power allocation values to be specified for spatial multiplexing—$(d_1, d_2) = (\frac{1}{2}, \frac{1}{2})$—and also separately for each instance of beamforming—e.g., $(d_1, d_2) = (1, 0)$ and $(d_1, d_2) = (0, 1)$. However, using two or more feedback bits to specify just the $d_1$ and $d_2$ values, not to mention additional precoding feedback bits for W, can impair feedback performance.

Accordingly, an efficient feedback methodology is needed to provide precoding feedback to the transmitter using a codebook to reduce the size of the feedback signal while sustaining a minimal loss in link performance. There is also a need for an improved feedback system which avoids degrading uplink performance and reduces long feedback delay. In addition, there is a need for a system and methodology for reducing the average precoder feedback rate to reduce uplink performance loss and feedback delay. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
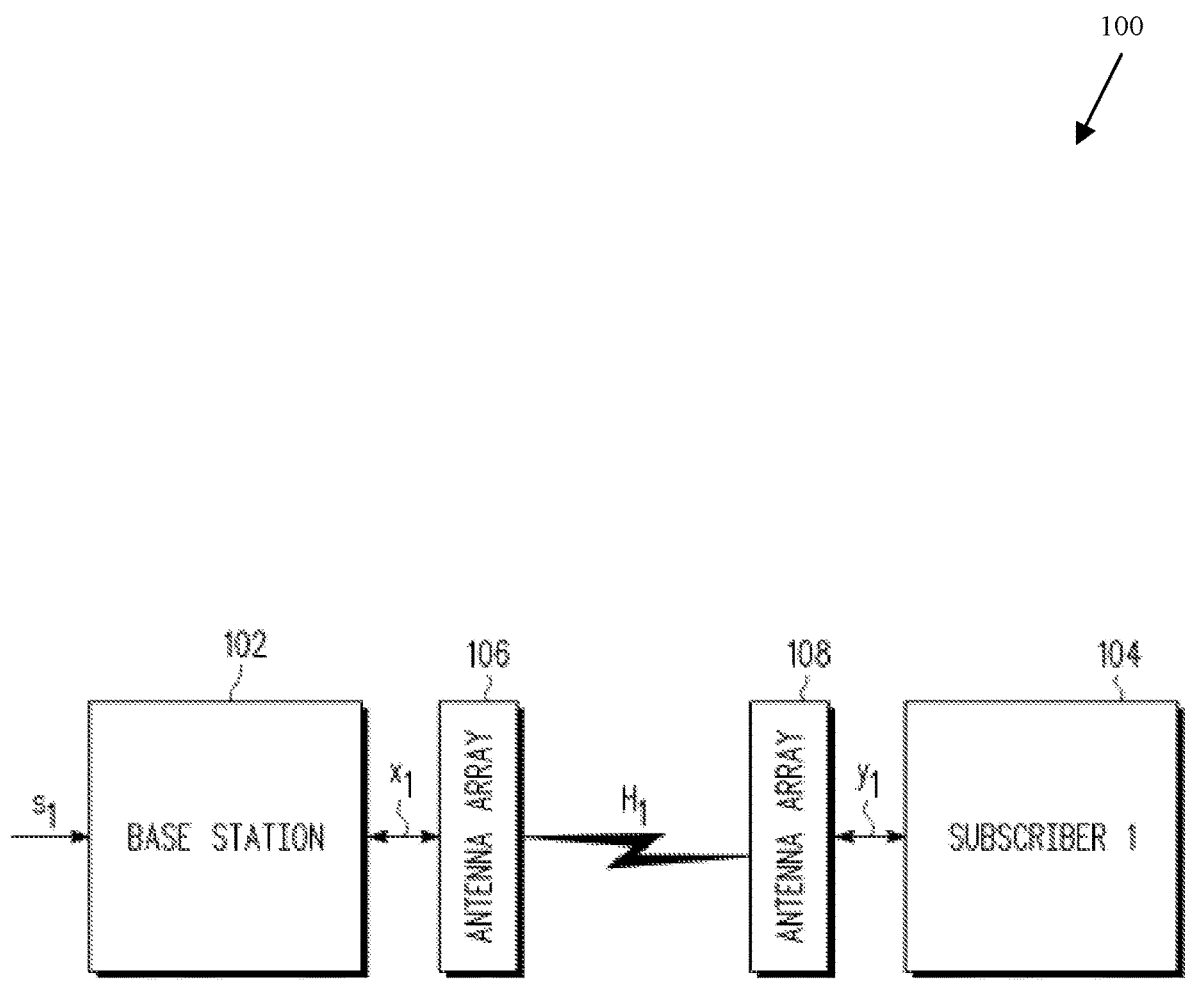
FIG. 1 (labeled prior art) depicts a wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A feedback control system and methodology are described for use in efficiently providing precoder feedback in wireless multi-input, multiple output (MIMO) systems. Using codebook-based precoding techniques, multi-stream transmission is enabled so that each stream is optimized with suitable precoding techniques, transmission power allocation and adaptive modulation and coding (AMC). In various example embodiments, a precoder matrix P is implemented with the matrix P=WD, where W is a unitary matrix coming from a pre-specified codebook, and D is a diagonal power allocation matrix referring to powers allocated to the streams. By choosing the per-stream powers in the non-unitary matrix D from a predetermined set of quantized values, the spectral efficiency of the link may be optimized based on the set of available AMC curves/profiles, and the precoding feedback can be provided with a smaller feedback to switch between beamforming and spatial multiplexing. For example, in the case of a 2×2 MIMO system where two streams can be sent, by specifying that the power allocation value $d_1$ of the non-unitary diagonal matrix $$D = \begin{bmatrix} d_1 & 0 \\ 0 & d_2 \end{bmatrix}$$

is selected from the set of $\{1, \frac{1}{2}\}$, then a power allocation value of $d_1=\frac{1}{2}$ implies that $d_2=\frac{1}{2}$ and that a spatial multiplexing power allocation (two stream transmission) is being specified, while a power allocation value of $d_1=1$ implies that $d_2=0$ and that a beamforming power allocation (single stream transmission) is being specified. So long as the D matrix is constrained to specify that all beamforming power allocations are forced to transmit full power on a predetermined stream (e.g., $d_1$), each power allocation value in the D matrix may be represented by a one-bit feedback value. To accommodate such design constraints on the D matrix, the spatial streams may be processed before selecting the codematrix values for the unitary matrix W to reflect the implicit beamforming power allocation specified by the predetermined set of quantized values. With this example design constraint for the D matrix, the transmitted streams or beams would be manipulated to reposition or swap the dominant transmitted stream with the stream in the first position before selecting the codematrix values for the unitary matrix W. Of course, if the D matrix specifies that full beamforming power is applied to another stream (e.g., $d_2$), then the eigenvector manipulation would be adjusted accordingly. By constraining the design of the D matrix in this way, a single bit of feedback may be used to switch between spatial multiplexing and beamforming, where the single bit specifies a first power allocation for spatial multiplexing (e.g., both streams are transmitted with half power) with a first value, and specifies a second power allocation for beamforming (e.g., where the first stream is transmitted with full power and the second stream with zero power) with a second value. Further, in order to facilitate switching between closed-loop and open-loop transmission, the codebook for the unitary matrix W should include one entry that is the identity matrix for use with open-loop transmissions. Thus, open loop transmission can be facilitated by using the identity matrix from the codebook for W and having $d_1=\frac{1}{2}$ and $d_2=\frac{1}{2}$. As will be appreciated, the foregoing techniques may be applied to codebooks having more than two possible values. For example, where the power levels per stream in the non-unitary matrix D are selected from a finite set of m quantized values, a codebook having a size $m^{(n-1)}$ would require only $\log_2 m^{(n-1)}$ bits of feedback. As will be appreciated, other transmission profile parameters that are fed back to the transmitter may be encoded to indicate if spatial multiplexing or beamforming is to be used at the transmitter. For example, the channel quality indicator (CQI) values for the channel streams may be encoded prior to feedback to indicate whether spatial multiplexing or beamforming is to be used, such as by setting a predetermined CQI value below a threshold value to indicate that beamforming has been chosen or by differentially encoding the CQI values to indicate the relative value of the current CQI value (as compared to the previous CQI value) and to indicate if beamforming or spatial multiplexing is chosen. While described herein with reference to an example 2×2 MIMO system, it will be appreciated that the present invention may be applied to other MIMO system configurations, including but not limited to 4×4 MIMO systems.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
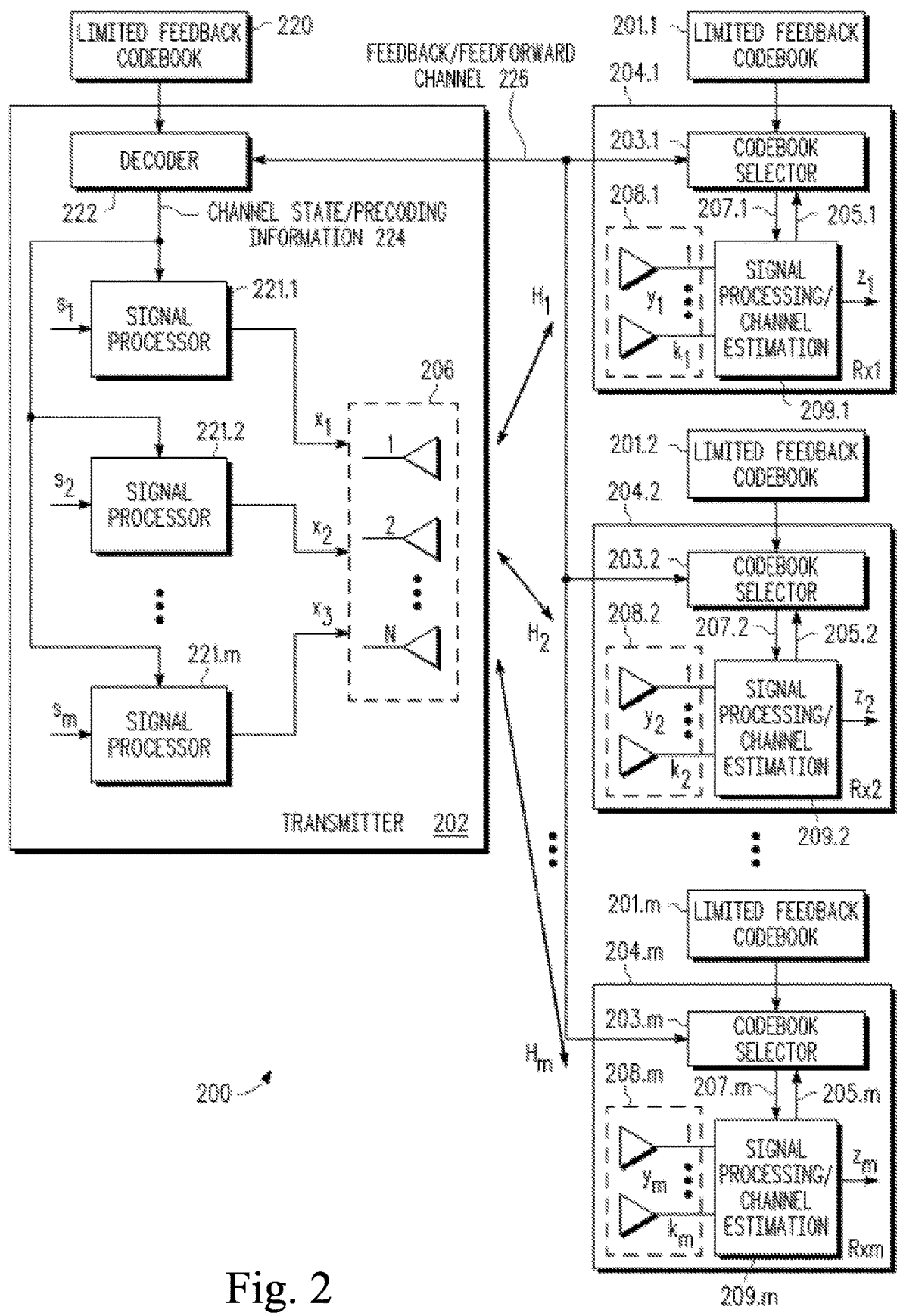
FIG. 2 depicts a wireless communication system in which limited feedback codebooks are used at a base station and subscriber stations.

FIG. 2 depicts a wireless communication system 200 in which a transmitter 202 uses codebook based techniques to precode one or more input signals that are transmitted from a transmitter 202 (e.g., a base station) to one or more receivers 204.1-204.$m$ (e.g., subscriber stations). The transmitter 202 includes an array 206 of one or more antennas for communicating with the receivers 204.1 through 204.$m$, each of which includes an array 208.$i$ having one or more antennas for communicating with the transmitter 202. In operation, a data signal vector $s_i$ presented at the transmitter 202 for transmission to the receiver 204.$i$ is transformed by the signal processor 221.$i$ into a transmission signal represented by the vector $x_i$. The signals transmitted from the transmit antenna 206 propagate through a matrix channel $H_i$ and are received by the receive antennas 208.$i$ where they are represented by the vector $y_i$. For a MIMO channel from the transmitter 202 to the $i^{th}$ receiver 204.$i$, the channel is denoted by $H_i$, $i \in \{1, 2, \ldots, m\}$. The channel matrix $H_i$ may be represented as a $k_i \times N$ matrix of complex entries representing the complex coefficients of the transmission channel between each transmit-receive antenna pair, where N represents the number of transmitter 202 antennas, and $k_i$ represents the number of antennas of the $i^{th}$ receiver 204.$i$. At the receiver 204.$i$, the signal processing unit 209.$i$ processes the $y_i$ signals received on the k antennas to obtain a data signal, $z_i$, which is an estimate of the transmitted data vector $s_i$. The processing of the received $y_i$ signals may include combining the $y_i$ signals with appropriate combining vector information 207.$i$ retrieved from the codebook 201.$i$.

Precoding for downlink transmissions (transmitter to receiver) may be implemented by having each receiver 204.$i$ determine its MIMO channel matrix $H_i$—which specifies the profile of the transmission channel between a transmitter and an $i^{th}$ receiver—in the channel estimation signal processing unit 209.$i$. For example, in a MIMO implementation, each receiver 204.1-$m$ determines its MIMO channel matrix $H_i$ by using pilot estimation or sounding techniques to determine or estimate the coefficients of the channel matrix $H_i$. Each receiver 204.$i$ uses the estimated MIMO channel matrix or other channel-related information (which can be channel coefficients or channel statistics or their functions, such as a precoder, a beamforming vector or a modulation order) to generate precoding information, such as precoding and power allocation values, appropriate for the MIMO channel matrix. This may be done by using the channel-related information to access a precoder stored in the receiver codebook 201.$i$. In addition and depending on the system design, each receiver 204.$i$ determines the channel-related information required for adaptive modulation and coding precoding.

Rather than feeding back the entire vector or matrix representation of the transmission channel or related precoding matrix or precoding information (which would require a large number of bits), the receiver 204.$i$ uses a codebook 201.$i$ to quantize the precoding information that is generated from the estimated channel matrix information and that will be used by the transmitter in controlling signal transmission to the receiver. The receiver codebook 201.$i$ may be used to store an indexed set of possible channel profiles or matrices $H_i$ along with associated precoding matrix or precoding information so that the estimated channel matrix information 205.$i$ generated by the signal processing unit 209.$i$ can be used by the codebook selector 203.$i$ to retrieve an index from the limited feedback codebook 201.$i$ and provide the retrieved index over a feedback channel (e.g., a low rate feedback channel 226) to the transmitter 202. Based on the feedback of the precoding index, the decoder 222 at the transmitter 202 retrieves from the codebook 220 a matching transmission channel profile or related precoding information 224 for a particular subscriber station 204.$i$ which is used to precode the transmission signal (e.g., $s_1$). In this way, codebook-based feedback enables a variety of techniques, including but not limited to precoding, power allocation, and adaptive modulation and coding. While the present description is directed primarily to the example of performing precoding for downlink signal transmissions, it will be appreciated that precoding for uplink transmissions may also be implemented by having the transmitter 202 determine or estimate the uplink MIMO channel matrix information and use this information to generate a precoding index which is fed back to the receiver 204.$i$ to control signal transmissions from the receiver 204.$i$ to the transmitter 202.

Figure 3:
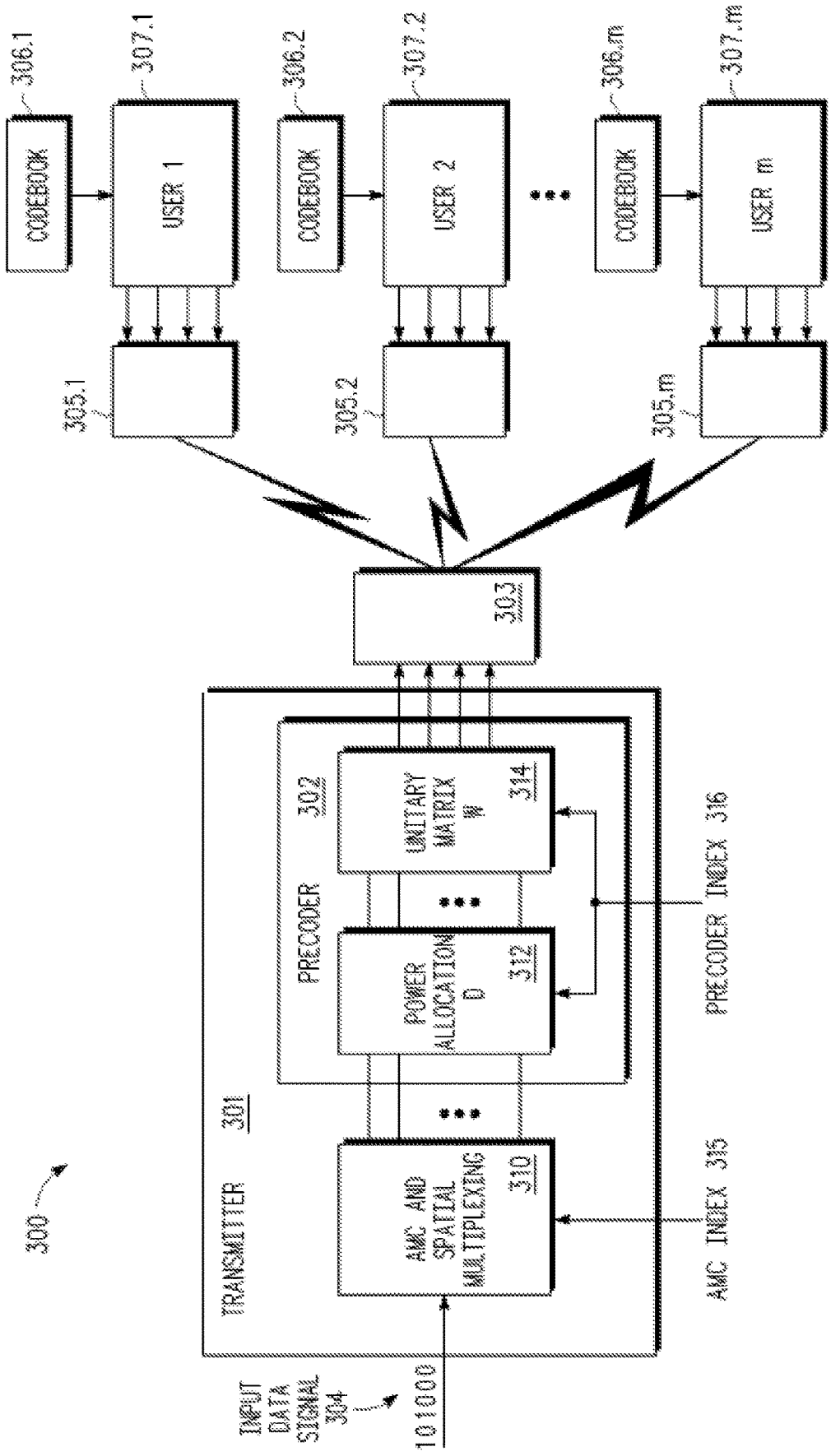
FIG. 3 depicts a block diagram of a transmitter using a non-unitary precoder codebook.

FIG. 3 depicts a wireless communication MIMO system 300 in which a transmitter station 301 communicates with m receiver stations 304.1 through 304.$m$. As depicted, the transmitter station 301 includes an array 303 of multiple antennas for communicating with the receiver stations 304.1 through 304.$m$, and each receiver station includes respective antenna arrays for communicating with the transmitter station 301. In accordance with various illustrative embodiments of the wireless communication system 300, the transmitter station 301 includes a codebook 302 which is accessed to obtain a transmission profile and/or precoding information to be used to process the input data signal 304 to make best use of the existing channel conditions for individual receiver stations. In addition, each receiver station includes the same codebook 306.$i$ for use in efficiently transferring information in either the feedback or feedforward channel, as described herein below.

In various embodiments, the codebook is constructed as a composite product codebook from separable sections, where the codebook index 316 may be used to access the different sections of the codebook 302. For example, one or more predetermined bits from the codebook index 316 are allocated for accessing the diagonal matrix 312, while a second set of predetermined bits from the precoder index 316 is allocated to indicate the values for the unitary matrix 314 and possibly a third set of predetermined bits from the precoder index 316 is allocated to indicate the modulation and coding used on the streams.

In various embodiments, instead of having a single codebook at each of the transmitter and receiver(s), separate codebooks can be stored so that there is, for example, a codebook for the unitary precoding matrix W, a codebook for the diagonal matrix D, and possibly a codebook for the AMC values. In such a case, separate indices may be generated wherein each index points to a codeword in its corresponding codebook, and each of these indices may be transmitted over a feedback channel to the transmitter, so that the transmitter uses these indices to access the corresponding codewords from the corresponding codebooks and determine a transmission profile or precoding information.

To illustrate an example application where precoding is used to decouple the input data signal 304 into two orthogonal spatial streams, the unitary matrix W 312 may be implemented after diagonal power allocation matrix D 312 that is applied to the output of a spatial multiplexer 310 to provide the powers to be allocated for each beam. The per-stream power is chosen from a quantized set of power levels to optimize a performance metric such as spectral efficiency of the link based on the set of available AMC curves/profiles. As for the unitary matrix 314, it may be implemented as a precoding matrix W from a pre-specified codebook. As a result, the structure of the precoder P 302 may be represented as P=DW.

In this example application, the size of the codebook used to access the precoder P 302 may be reduced by constraining the design of the power allocation matrix D 312 to always use a predetermined stream (e.g., the first stream) to provide full power along with forcing the first column of W to be the dominant column when it is determined that single stream transmission or beamforming is to be used. As a result, the power allocation matrix D 312 includes only two values—a "1" to indicate that beamforming will occur with full power on the first stream, and a "½" to indicate that spatial multiplexing will occur with half power on the first stream. With this constraint, various embodiments of the present invention allow a single feedback bit to be used to switch between spatial multiplexing (where both streams are transmitted with equal (e.g., 50%) power, $d_1=½$ and $d_2=½$) and beamforming (where the first stream is transmitted with full (e.g., 100%) power, $d_1=1$ and $d_2=0$). In particular, upon receiving a one-bit feedback index indicating that the power value for the first stream $d_1$ is "1," the transmitter 301 can automatically determine that beamforming has been selected so that the power value for the second beam $d_2$ is "0." Likewise, upon receiving a one-bit feedback index indicating that the power value for the first beam $d_1$ is "½," the transmitter 301 can automatically determine that spatial multiplexing has been selected so that the power value for the second beam $d_2$ is "½."

As a result of this constraint in the design of the power allocation matrix D 312, the power allocation portion of the precoder index 316 need not include feedback bits to separately identify a spatial multiplexing power allocation and two separate beamforming power allocations, one for providing full power to the first beam and another for providing full power to the second beam. For example, conventional techniques for providing feedback would separately specify all possible power allocation values for both beams ($d_1$ and $d_2$), requiring as many as two feedback bits to describe the three possible values (1, ½, 0) for the first beam $d_1$ and consequently three possible values (0, ½, 1) for the second beam $d_2$. Instead, one feedback bit can be used to reference the possible power allocation values of the constrained power allocation matrix D 312.

If the design of the power allocation matrix D 312 is constrained to always allocate full power to the first stream during beamforming operations, the codematrix selection from the unitary matrix W should be adjusted to take into account situations where the full beamforming power should actually be provided on the second stream. This adjustment can be accomplished in situations where the second beam is dominant by inverting or switching the columns of the unitary matrix W prior to retrieving its corresponding quantized codematrix from the codebook for W. Conversely, if the power allocation matrix D 312 is constrained to always allocate full power to the second stream during beamforming operations, the codematrix selection for the unitary matrix W is adjusted to take into account situations where the full beamforming power should actually be provided on the second stream. The swapping of channel eigenvector positions prior to accessing the unitary matrix W 314 does not impair the function of the unitary matrix W 314, which is to resolve the MIMO channel into parallel spatial channels. In addition, this swapping technique facilitates the switching between spatial multiplexing and beamforming by reducing the size of the required feedback information for accessing the power allocation matrix D 312.

As a generalization of the foregoing, the techniques described herein may be extended to other MIMO channel configurations. For example, with 4×4 MIMO channel, a single feedback bit can be used for power allocation, where a "1" value for the feedback bit indicates beamforming for the rearranged dominant stream, and where a "0" value indicates equal power (e.g., ¼ power) on all streams. By constraining the design of the power allocation matrix D 312 so that the first beam provides the highest power level, the second beam provides the next highest power level, and so on, the size of the precoder index 316 may be reduced so long a the beams are swapped and re-sorted accordingly prior to retrieving codematrix values from the unitary matrix W 314. As a result, in the case where the jth beam is dominant, the first and jth beams are swapped, and likewise, the remaining beams are repositioned to reflect the power level ranking constraints of the power allocation matrix D 312 prior to accessing the unitary codebook W. If desired, additional feedback bits can be used to indicate m power levels. In an example embodiment, an 'n' bit codebook for the power allocation matrix D 312 may be used to specify the power levels for each stream that are selected from a finite set of m power levels (e.g., 100%, 80%, 60%, etc.). The resulting codebook contains m^(n−1) entries which can be selected with log 2(m^(n−1)) bits.

The switching is further facilitated by including an identity matrix as an entry of the unitary codebook W 314. For example, if one entry of the unitary codebook W 314 is an identity matrix, the identity matrix entry can be used, along with the equal-power-per-beam power allocation from codebook D 312, for the case of open-loop transmission. This allows switching between open loop and closed loop transmission at the physical layer.

While FIG. 3 depicts the precoder 302 as being located at the transmitter station 301, it will be appreciated that each user or receiver station 307.*i* may also include its own precoder which, in various embodiments, may be implemented as a codebook 306.*i*. Where the channels are not reciprocal in both directions (for example, in the case of an FDD system), each station can generate a precoder index which represents (in quantized form) the precoding information generated at the station. The precoder index is then fed back to the other station which applies the precoder index to its precoder to retrieve precoding information that is applied to a data signal that is being transmitted by the other station. Where the receiver station 307.*i* includes a precoder codebook and the transmitter station 301 is able to directly estimate the channel information for the channel between the transmitter station 301 and receiver station 307.*i* (for example, in the case of a TDD system), the transmitter station 301 can itself determine the transmission profile to be applied to the input data signals transmitted by the transmitter station 301. By having the transmitter quantize the transmission profile into a precoder index which is then fed forward to the receiver station 307.*i*, the receiver station can use the precoder index to retrieve the corresponding transmission profile from the receiver codebook for purposes of processing the signal received at the receiver station 307.*i*. In accordance with the foregoing, the transmitter station 301 and/or receiver station 307.*i* include a processor, software executed by the processor, and other hardware that allow the processes used for communication and any other functions performed by the transmitter station 301 and each of receiver stations 307.*i*.

In addition to enabling codebook-based precoding with a reduced feedback, the use of a precoder at the receiver 307.*i* allows the receiver 307.*i*. to decide whether to use beamforming or spatial multiplexing precoding to be made, and also when to use open loop transmission or use closed loop transmission with codebook precoding. This accelerates the precoding processing by avoiding the delay caused when transmission-related decisions (such as whether to use spatial multiplexing or beamforming or whether to use closed loop or open loop transmission) are made in the upper software layers (e.g., the MAC layer) of the transmitter station 301.

Figure 4:
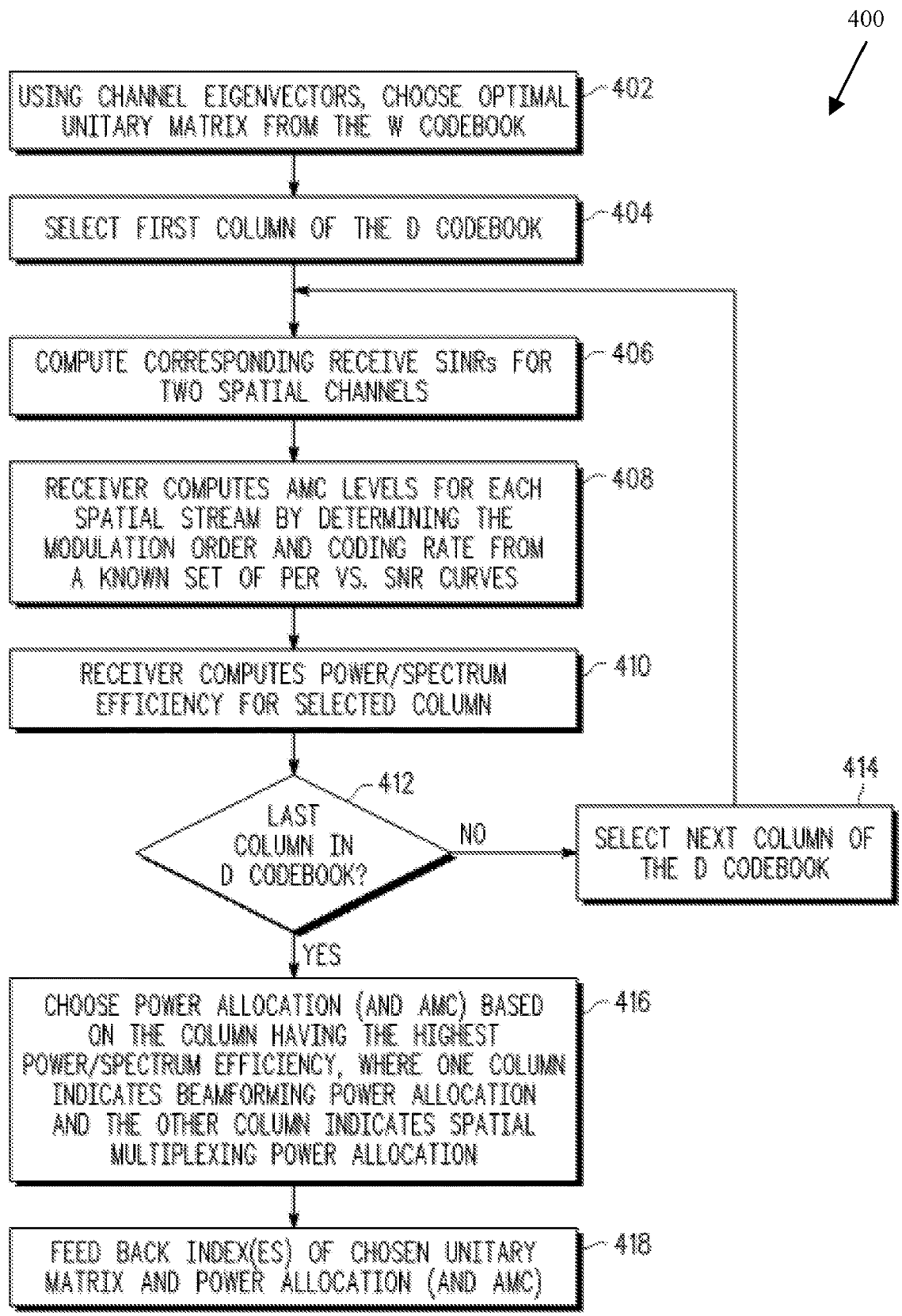
FIG. 4 depicts a first example flow for a non-unitary precoding methodology for generating and feeding back a precoder index.

FIG. 4 depicts a generalized non-unitary precoding methodology for generating and feeding back a precoder index. As a preliminary step (not shown), the MIMO transmission channel to a given receiver station is estimated. Generally, a transmission channel can be estimated by embedding a set of predetermined symbols, known as training symbols, at a transmitter station and processing the training symbols at a receiver station to produce a set of initial channel estimates. In this example, the MIMO transmission channel being estimated at the receiver station may be characterized as a channel matrix H. The singular value decomposition (SVD) of the MIMO channel matrix $H = U \Lambda V^H$, where the matrix U is a left eigen matrix representing the receive signal direction, the matrix $\Lambda$ represents the strength (or gain) of the channel and the matrix V is a right eigen matrix representing the transmit signal direction.

In one of several embodiments, at the receiver station, precoding information is generated based on the channel estimate information, beginning with step 402, where the channel eigenvectors from the estimated MIMO channel are used to choose the optimal unitary codematrix from the W codebook and to compute the signal to interference plus noise ratio (SINR) for each spatial channel or beam. While any desired optimization technique may be used, the unitary codematrix that is closest to the right eigen matrix V based on a predetermined metric such as 'chordal distance' may be selected as the optimal unitary codematrix. Likewise, any desired algorithm may be used to compute the SINR for each stream.

Based on the chosen unitary codematrix, the power allocation precoding may also be selected, either separately or in combination with the selection of the AMC level/scheme. In an example embodiment where the receiver station chooses the parameters for unitary precoding, power allocation and adaptive modulation and channel coding, the precoding process begins by selecting the first column of the power allocation codebook for D (step 404). Next, the receiver station computes the corresponding receive SINRs for the spatial channels (step 406) using any desired SINR computation technique. The receiver station can then use the receive SINRs and a required packet error rate (PER) to compute AMC information by determining the modulation order and coding rate from a known set of PER vs. SINR curves (step 408). In addition, the power or spectrum efficiency (bits/s/Hz) for the selected column is computed (step 410). If the other columns of the power allocation codebook for D have not been processed (negative outcome to decision block 412), the process is repeated by selecting the other columns of the power allocation codebook for D (step 414) and repeating steps 406, 408 and 410 until there are no more columns to process (affirmative outcome to decision block 412).

Once the entire power allocation codebook for D has been processed, the column in the codebook for D having the largest power or spectrum efficiency is chosen (step 416). By virtue of the constrained design of the power allocation codebook for D, one of the columns indicates that the precoding will use a beamforming power allocation and the other column indicates that the precoding will use a spatial multiplexing power allocation.

At this point in the process, the precoding power allocation (and possibly AMC precoding) have been selected on the basis of the optimal unitary matrix chosen at step 402. In accordance with various embodiments of the present invention, the performance of the precoding can be improved by swapping the columns of the channel eigenvector matrix and repeating steps 402-416. If the resultant precoding for this case yields a higher power/spectrum efficiency than the original case, then the precoding for the new case should be used. In addition or in the alternative, an exhaustive search may be performed of all the codematrices from the W codebook by performing steps 404-416 for each codematrix from the W codebook to determine the codematrix having the highest power/spectrum efficiency, and in this way the optimal codematrix from the W codebook is chosen.

Finally, the codebook indices corresponding to the chosen unitary matrix from the W codebook and to the chosen column in the power allocation codebook for D are fed back (step 418), either alone or in combination with an AMC codebook index. In alternate embodiments when a composite product codebook of all the above codebooks is used, a single index may be fed back which indicates a codeword in the composite product codebook. At the transmitter station, the precoding index is used to apply precoding to the input data signal along with the modulation and coding levels if indicated in the feedback.

Figure 5:
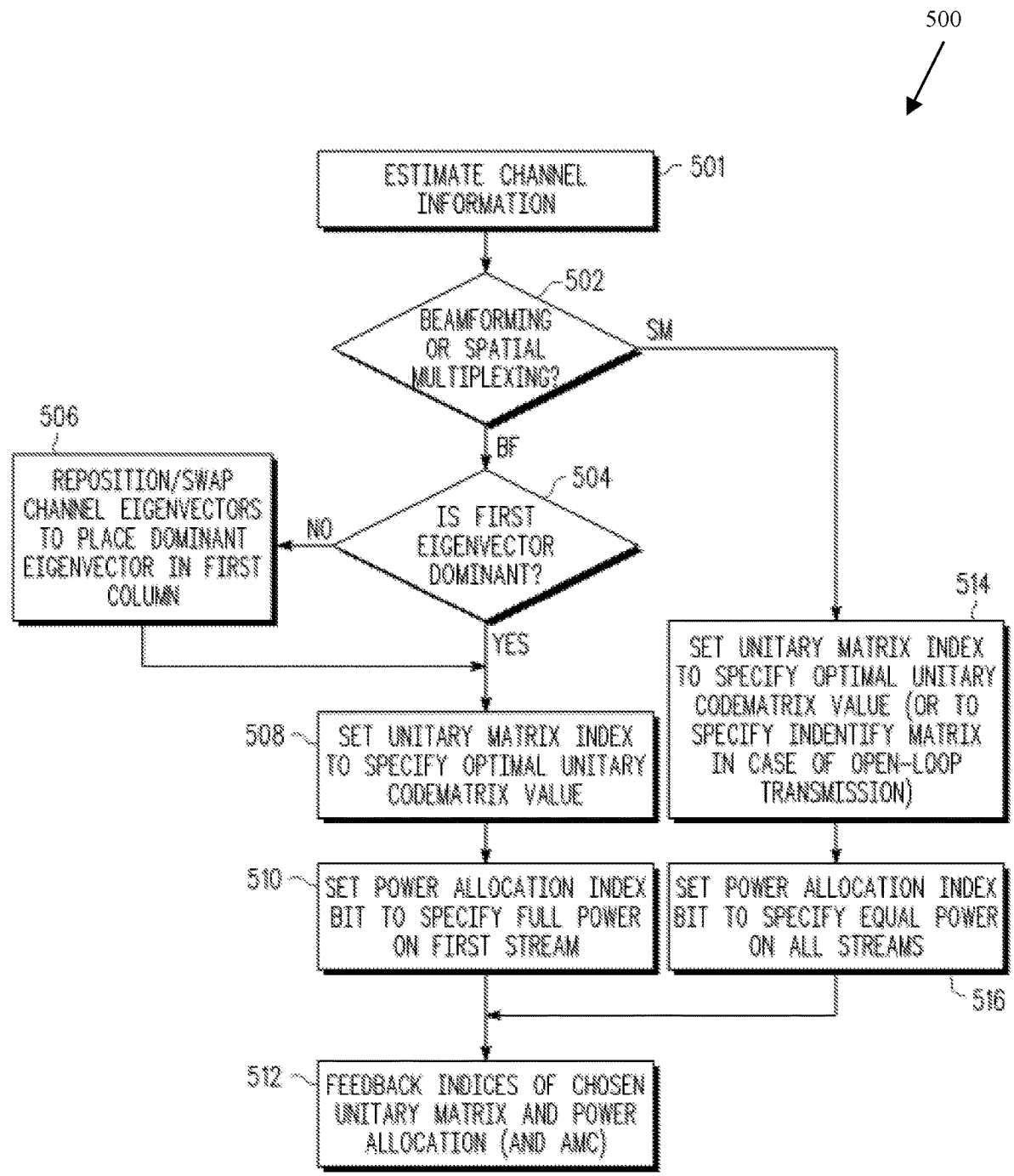
FIG. 5 depicts a process flow for feeding back a codebook-based precoder index to specify an optimal unitary codematrix value and power allocation value.

Selected embodiments of the present invention may also be illustrated with reference to FIG. 5, which depicts a simplified process flow 500 for feeding back a codebook-based precoder index to specify an optimal unitary codematrix value and power allocation value. As depicted, channel profile information is estimated for the MIMO transmission channel to the receiver at step 501. Based on the channel profile information, a determination is made at decision block 502 on whether to use beamforming precoding or spatial multiplexing precoding. If beamforming is selected (BF outcome from decision block 502), the design constraints of the power allocation matrix D described hereinabove may require an adjustment of the channel eigenvectors (step 506) if the first channel eigenvector is not dominant (negative outcome to decision block 504). Once any necessary repositioning of the spatial beams occurs (step 506) or if none is required (affirmative outcome to decision block 504), the unitary matrix index is set to specify an optimal codematrix value (at step 508) and the power allocation index bit is set to specify that full power is to be applied to the first stream (step 510). With the indices set, they can then be fed back to the transmitter station, either alone or in combination with any AMC index (step 512).

If, on the other hand, spatial multiplexing is selected (SM outcome from decision block 502), the unitary matrix index is set to specify an optimal codematrix value for use in a closed-loop transmission (at step 514) and the power allocation index bit is set to specify that equal power is to be applied to all streams (step 516). Alternatively, in the case of open-loop transmission, the unitary matrix index is set to specify an identity codematrix value contained in the unitary codebook W (at step 514) before setting the power allocation index bit. With the indices set, they can then be fed back to the transmitter station, either alone or in combination with any AMC index (step 512).

When a comparison is made of the spectrum efficiencies by simulating different MIMO systems using different quantized power control feedbacks, the simulations show that a 1-bit quantized power allocation achieves a spectrum efficiency that is similar to that for power allocation precoding that is quantized with larger feedback indices. For example, when a 2×2 MIMO channel is simulated with independent identically distributed (i.i.d.) Rayleigh fading over a narrow band assuming an ideal precoder, a 1-bit quantized power allocation achieves a similar spectrum efficiency as the 2-bit feedback case for transmit SNR values below 13 dB, and also achieves a similar spectrum efficiency as the 5-bit feedback case for transmit SNR values below 6 dB. In addition, the spectrum efficiency for a 1-bit quantized power allocation is at least as good as or better than the spectrum efficiency where equal power is used (e.g., for spatial multiplexing without feedback). On the other hand, when a 4×2 MIMO channel is simulated with i.i.d. Rayleigh fading over a narrow band assuming an ideal precoder, the spectrum efficiency for a 1-bit quantized power allocation is not as good as for power allocation precoding that is quantized with larger feedback indices, and instead more closely tracks the spectrum efficiency where equal power is used. The smaller gains for the 1-bit quantized power allocation may be due to the higher diversity gain of the 4×2 MIMO spatial channels.

As described above, codebook feedback information is fed back to the transmitter in the form of an index of the chosen unitary matrix codeword, an index to choose an AMC level and a one-bit power control feedback index indicating if spatial multiplexing or beamforming is to be used at the transmitter. In this way, the index for the power allocation matrix D is effectively encoded to choose between spatial multiplexing (SM) and beamforming (BF). However, it will be appreciated that other transmission profile parameters that are fed back to the transmitter may be encoded to indicate if spatial multiplexing or beamforming is to be used at the transmitter. For example, instead of sending back an index to choose an AMC level, the transmitter can derive the required AMC level from a channel quality indicator (CQI) value, such as a CINR (Carrier-to-Interference plus Noise Ratio) or SINR (Signal-to-Interference plus Noise Ratio)

value. With this approach, the receiver determines the CQI value for each stream, encodes the CQI value(s) to indicate whether spatial multiplexing or beamforming is to be used, and feeds back the encoded CQI values to the transmitter.

Figure 6:
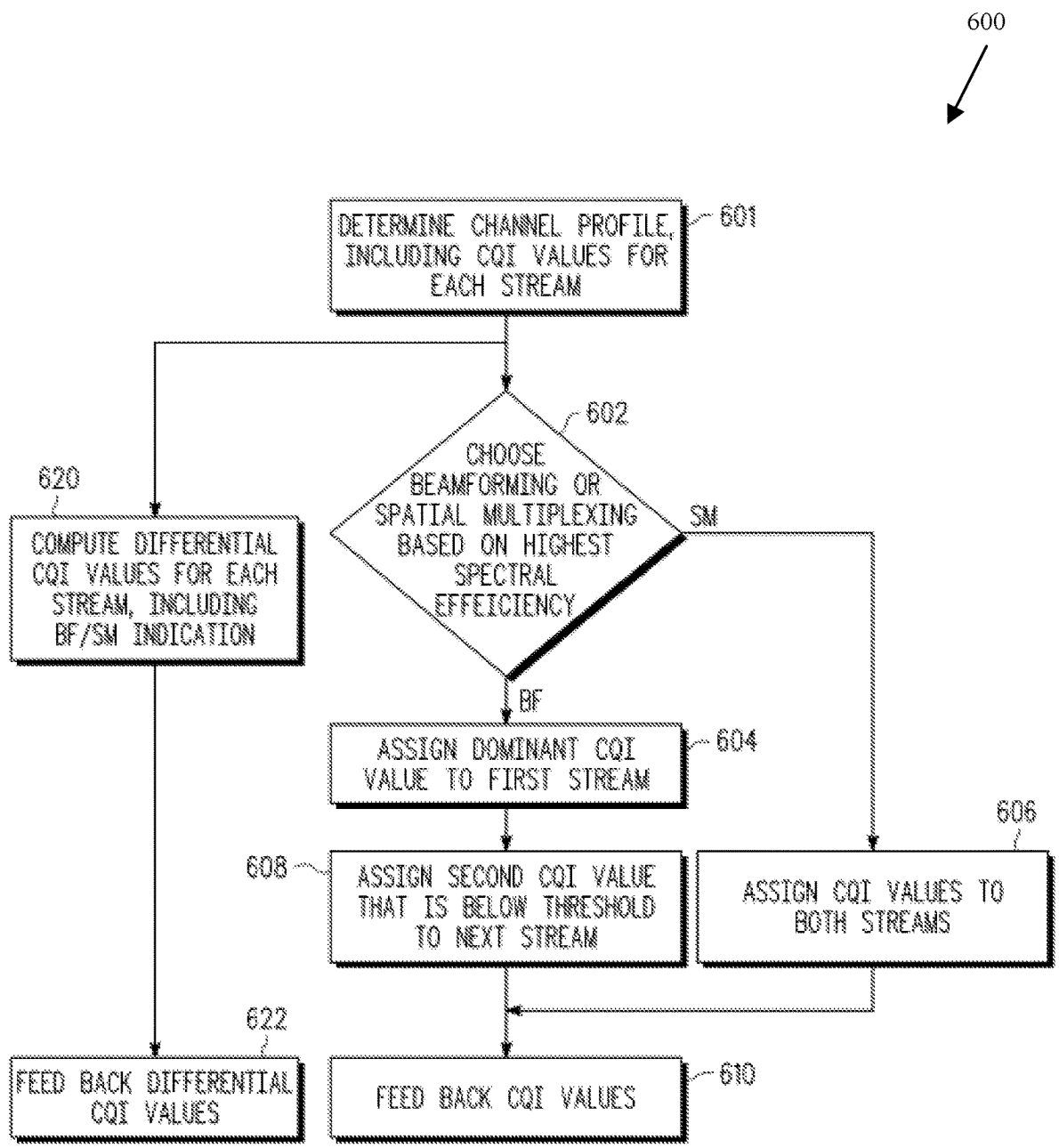
FIG. 6 depicts two process flows for encoding and feeding back CQI values to specify the use of spatial multiplexing or beamforming at the transmitter.

While a variety of CQI encoding techniques can be used, FIG. 6 depicts two example process flows 600 for encoding and feeding back CQI values to specify the use of spatial multiplexing or beamforming at the transmitter. As depicted, the receiver determines a transmission channel profile for the estimated MIMO channel (step 601), such as by using estimated channel information for the MIMO transmission channel to retrieve a channel profile from a multi-parameter codebook. However, rather than determining a parameter for an AMC level at this point, the receiver detects the CQI values for each data stream being sent over the MIMO transmission channel. In an example 2×2 MIMO case, there are two streams transmitted, so two CQI values are computed at the receiver, one for each stream.

However, rather than using a separate feedback signal to choose between beamforming and spatial multiplexing, this information is encoded in the CQI values. In a first selected embodiment, a receiver in a 2×2 MIMO system encodes the CQI values by first choosing between spatial multiplexing or beamforming. While any desired metric may be used, the choice may be made by computing CQI values for both the beamforming and spatial multiplexing scenarios, and then using the computed CQI values to compute and compare the respective spectral efficiencies for each scenario (decision block 602). If beamforming is chosen (BF output from decision block 602), the CQI values are computed by assigning the dominant CQI value (e.g., the value for the highest channel quality) to the first stream (step 604), and using the second CQI value to indicate that beamforming is selected by assigning a second CQI value that is below a predetermined threshold (step 608). For example, the second CQI value may be set to a predetermined value (e.g., a "BF value") when beamforming is selected. If the value of the second CQI is set or forced to a very low value (e.g., one that is much lower than possible practical values), then it indicates that that stream has almost zero CQI, which in turn indicates that beamforming is selected. On the other hand, if spatial multiplexing is selected (SM output from decision block 602), the computed CQI values are assigned to each stream. As a result, the second CQI value is set to a value which is above a predetermined threshold and which indicates the channel quality (e.g., CINR, SINR, etc.) of the second stream (step 606). As a result, the first CQI value will indicate the dominant beam's CINR/SINR, while the second CQI value will indicate beamforming (if its value is below the predetermined threshold) or spatial multiplexing (if its value is above the predetermined threshold, in which case the second CQI value indicates the CINR/SINR of the second stream). Thus encoded, the CQI values are fed back to the transmitter (step 610). Using this CQI information, the transmitter can choose the AMC scheme. In addition, the transmitter can evaluate the second CQI value to determine if beamforming is selected (where the second CQI value is below the predetermined threshold) or if spatial multiplexing is selected (where the second CQI value is above the predetermined threshold). As will be appreciated the predetermined threshold should be known to both the transmitter and receiver, and may be chosen to separate possible practical CQI values from CQI values that are not possible or practical. Using encoded CQI information in such a way saves a SM/BF selection bit which would otherwise be required.

This technique may be extended into other MIMO channel configurations. For example, in the case of 4×4 MIMO systems, the receiver feeds back four encoded CQI values. For each stream that is not to be transmitted on, the receiver will feed back a very low CQI value fed back. However, for each stream that is to be transmitted on, the receiver feeds back its CINR/SINR value, which the transmitter uses to choose the AMC scheme.

In another embodiment depicted in FIG. 6, the CQI values determined at step 601 may be differentially encoded to indicate if beamforming or spatial multiplexing is chosen. In this second example embodiment, a receiver encodes each computed CQI value for a given time interval by comparing it to the corresponding CQI value from a previous time interval. Based on the comparison, the CQI value is represented as a differential CQI value at step 620 by using one of four values: up, down, same and off. The "up" value indicates that the CQI value is higher than the previous CQI value, the "down" value indicates that the CQI value is lower than the previous CQI value, and the "same" value indicates that the CQI value is the same as the previous CQI value. As for the "off" value, this indicates that the stream is to be turned off, thereby providing a mechanism for beamforming. For example in a MIMO system with two possible streams, the CQI feedback corresponding to only one of the streams is set to "off", thereby rendering beamforming or single stream transmission. In general, in a MIMO system with say "k" streams, this mechanism can be used to turn "off" any stream as desired. In this way, a conventional CQI value, which might be represented with five or more bits, is now represented as a differential CQI value with only two bits to identify the four values. When these differential CQI values are fed back to the transmitter (step 622), the "up", "down" and "same" values are used at the transmitter to derive a CQI value from the previous CQI value. For example, if the differential CQI value indicates "up," the transmitter derives the current CQI value by incrementing the previous CQI value by a predetermined increment. If it is desired to have greater flexibility in adjusting the CQI values at the transmitter (e.g., using more than a single predetermined increment to adjust CQI values), the CQI values may be differentially encoded using more values to provide a plurality of adjustment amounts (e.g., "up by 1," "up by 2," "down by 1," "down by two," same and off). Though the additional values will require additional bits during feedback, these values can be used to more accurately and flexibly derive CQI values at the transmitter.

By now it should be appreciated that there has been provided a method and system for precoding signals in a MIMO communication system. At the receiver, channel information is estimated for the transmission channel between the transmitting device and a receiving device by receiving one or more signals, where the transmission channel may be any type of MIMO channel, including but not limited to a a 2×2 MIMO channel, a 2×4 MIMO channel, a 4×2 MIMO channel or a 4×4 MIMO channel. Based on the estimated channel information, precoding information is generated for the transmission channel by identifying a precoding profile from a codebook that corresponds to the channel information. As described, the codebook includes a plurality of codewords, each of which includes at least a unitary precoding matrix portion. In selected embodiments, the unitary precoding matrix portion includes an identity matrix value for use with precoding for open-loop transmission in conjunction with equal power for each of the plurality of streams. The codewords in the receiver codebook also include a diagonal power control matrix (the D matrix) portion to provide power control values for the spatial streams, where a first power control value for beamforming specifies that full power is always applied to a predetermined one of the streams such that the unitary precoding matrix chosen for beamforming aligns the predetermined one of the streams to a dominant spatial channel of the plurality of streams. In addition, a second power control value for spatial multiplexing specifies that equal power is applied to each of the plurality of streams. The design of the D matrix is constrained so that the power control value for beamforming specifies that full power is always applied to a predetermined one of the beams with zero power to the other streams. With this constraint, precoding information may be generated by choosing a beamforming power control value for the diagonal power control matrix from a portion of the first codebook corresponding to the diagonal power control matrix, and then choosing a precoding matrix value for the unitary precoding matrix from a portion of the codebook corresponding to the unitary precoding matrix such that a first column of a chosen precoding matrix aligns with the dominant spatial channel. In one embodiment, the D matrix contains first and second indexed power control values, where the first indexed power control value specifies a beamforming power allocation for all streams (with full power being provided to only a first stream) and the second indexed power control value specifies a spatial multiplexing power allocation so that equal power is provided for all of the streams. In yet another embodiment, the codebook also includes a plurality of indexed values to indicate modulation and coding used on the streams. In another embodiment, the codebook portion corresponding to the diagonal power control matrix contains $m^{(n-1)}$ indexed power control entries corresponding to each stream taking one of m power levels and which may be accessed by an index of $\log 2(m^{(n-1)})$ bits. The codebook is used to quantize the precoding information corresponding to the first precoding profile into a precoding index. For example, the precoding information may be quantized by generating a one-bit power control feedback index from the D matrix to control power allocation on two beams such that a beamforming power allocation for the two beams is specified by the one-bit power control feedback index having a first value, and a spatial multiplexing power allocation for the two beams is specified by the one-bit power control feedback index having a second value. These techniques may be used to feedback the precoding index to a transmitter for controlling its transmission, or to feed forward a precoding index to a receiver to control its signal reception. Depending on the precoding processing performed by the receiver, the codebook index may include a first index portion for indicating a unitary precoding matrix value, a second index portion for indicating a power allocation value, and/or a third index portion for indicating an adaptive modulation and coding value. When the precoding index is sent over a feedback channel to the transmitting device, it may be used to access a transmitter codebook to retrieve a second precoding profile that matches the first precoding profile and that is used to control transmission over the transmission channel from the transmitting device to the first receiving device. In particular, the precoding index may include a quantized power control value that is used by the transmitter to switch between beamforming and spatial multiplexing transmission.

In another form, there is provided a communication device for precoding signals in a MIMO communication system. The communication device includes a precoding module (e.g., a processor) for generating a transmission profile for a transmission channel. The precoding module is configured to identify a first precoding value for a unitary precoding matrix that corresponds to estimated channel state information for the transmission channel and to quantize the first precoding value into a precoding index. In addition, the precoding module computes a channel quality indicator (CQI) value for at least a first spatial stream based on the estimated channel state information, and then encodes the CQI value into an encoded CQI value to indicate whether the first spatial stream is turned on or off and to indicate the CQI value for the first spatial stream if the first spatial stream is turned on. When the communication device is implemented as a receiver, it can send the precoding index and the encoded CQI value over a feedback channel to a transmitter for use in generating the transmission profile, where the encoded CQI value is used to control transmission over the transmission channel from the transmitter to the receiver. But when the communication device is implemented as a transmitter, the transmitter sends the precoding index and the encoded CQI value over a feed forward channel to a receiver for use in controlling processing of a signal transmitted over the transmission channel by the transmitter to the receiver. In selected embodiments, precoding module encodes the CQI value into an encoded CQI value by setting a predetermined CQI value below a threshold value to indicate that the first spatial stream is turned off. In addition or in the alternative, precoding module encodes the CQI value by differentially encoding the CQI value to indicate a relative value of the CQI value as compared to a previous CQI value and to indicate if the first spatial stream is turned off.

In yet another form, there is disclosed a method and system for generating a transmission profile for a MIMO transmission channel. As disclosed, a first precoding value from a unitary precoding matrix that corresponds to estimated channel state information for the transmission channel is quantized to form a precoding index. In addition, a feedback value is encoded into an encoded feedback value to indicate a number of spatial streams to be used during transmission of a data signal sent over the transmission channel, where the feedback value represents either a power control value or a channel quality indicator value. By then sending the precoding index and the encoded feedback value over a feedback channel to a transmitter, signal transmission over the transmission channel from the transmitter to a receiver can be controlled by the feedback information which specifies the number of spatial streams to be used during transmission.

The methods and systems for designing and using a non-unitary precoder codebook in a limited feedback MIMO system as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, precoding the modulated signals, preconditioning the precoded signals, and so on) and/or at the receiver (e.g., recovering the transmitted signals, demodulating and decoding the recovered signals, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various MIMO precoding systems and methods for using same, the present invention is not necessarily limited to the example embodiments illustrate herein. For example, various embodiments of a MIMO precoding system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for providing feedback for a multiple input multiple output (MIMO) system, the method comprising:
    forming, by a first device, a precoder index, wherein forming the precoder index includes quantizing a first precoding value from a precoder matrix that corresponds to estimated channel state information for a transmission channel of the MIMO system;
    encoding, by the first device, a feedback value into an encoded feedback value to indicate a number of spatial streams to be used during transmission of a data signal transmitted over the transmission channel, wherein the feedback value includes a channel quality indicator value; and
    transmitting, by the first device, the precoder index and the encoded feedback value via a wireless transmitter over a feedback channel to a second device.

2. The method of claim 1, further comprising:
    obtaining, by the first device, the estimated channel state information according to one or more signals received by the first device.

3. The method of claim 1, further comprising:
    generating, by the first device, the precoding value based on a first precoding profile retrieved from a first codebook that corresponds to the estimated channel state information.

4. The method of claim 3, further comprising:
    retrieving, by the second device, from a second codebook, a second precoding profile that matches the first precoding profile, wherein the second precoding profile is used to control the transmission of the data signal over the transmission channel from the second device to the first device.

5. The method of claim 3, wherein the first codebook includes a plurality of codewords, wherein each codeword includes a precoder matrix portion and a diagonal power control matrix portion to provide power control values for a plurality of streams.

6. The method of claim 1, wherein quantizing the first precoding value includes generating a power control bit to control power allocation on two streams, wherein a first value of the power control bit specifies beamforming power allocation for the two streams, and a second value of the power control bit different from the first value specifies spatial multiplexing power allocation for the two streams.

7. The method of claim 1, wherein the precoder index includes one of:
    a first index portion indicative of a precoder matrix value and a second index portion indicative of a power allocation value;
    first index portion indicative of a precoder matrix value, a second index portion indicative of a power allocation value, and a third index portion indicative of an adaptive modulation and coding value; or
    a quantized power control value that is used to switch between beamforming and spatial multiplexing transmissions.

8. An apparatus comprising:
    a memory element configured to store information; and
    a processor configured to use at least a portion of the information to:
        form a precoder index, wherein to form the precoder index the processor is configured to quantize a first precoding value from a precoder matrix that corresponds to estimated channel state information for a transmission channel of a MIMO system;
        encode a feedback value into an encoded feedback value to indicate a number of spatial streams to be used during transmission of a data signal transmitted over the transmission channel, wherein the feedback value includes a channel quality indicator value; and
        transmit the precoder index and the encoded feedback value via a wireless transmitter over a feedback channel to a device.

9. The apparatus of claim 8, wherein the processor is further configured to obtain the estimated channel state information according to one or more signals received by the apparatus.

10. The apparatus of claim 8, wherein the processor is further configured to generate the precoding value based on a first precoding profile retrieved from a first codebook that corresponds to the estimated channel state information.

11. The apparatus of claim 10, wherein the processor is further configured to receive the data signal over the transmission channel from the device, wherein transmission of the data signal is controlled according to a second precoding profile that matches the first precoding profile and was retrieved from a second codebook by the device.

12. The apparatus of claim 10, wherein the first codebook includes a plurality of codewords, wherein each codeword includes a precoder matrix portion and a diagonal power control matrix portion to provide power control values for a plurality of streams.

13. The apparatus of claim 8, wherein to quantize the first precoding value the processor is configured to generate a power control bit to control power allocation on two streams, wherein a first value of the power control bit specifies beamforming power allocation for the two streams, and a second value of the power control bit different from the first value specifies spatial multiplexing power allocation for the two streams.

14. The apparatus of claim 8, wherein the precoder index includes one of:
 a first index portion indicative of a precoder matrix value and a second index portion indicative of a power allocation value;
 a first index portion indicative of a precoder matrix value, a second index portion indicative of a power allocation value, and a third index portion indicative of an adaptive modulation and coding value; or
 a quantized power control value that is used to switch between beamforming and spatial multiplexing transmissions.

15. A receiver for providing feedback in a multiple input multiple output (MIMO) communication system, the receiver comprising:
 a processor configured to:
  form a precoder index, wherein to form the precoder index the processor is configured to quantize a first precoding value from a precoder matrix that corresponds to estimated channel state information for a transmission channel of a MIMO system; and
  encode a feedback value into an encoded feedback value to indicate a number of spatial streams to be used during transmission of a data signal transmitted over the transmission channel, wherein the feedback value includes a channel quality indicator value; and
 radio circuitry communicatively coupled to the processor and configured to transmit the precoder index and the encoded feedback value via a feedback channel to a device.

16. The receiver of claim 15, wherein the processor is further configured to generate the precoding value based on a first precoding profile retrieved from a first codebook that corresponds to the estimated channel state information.

17. The receiver of claim 16, wherein the processor is further configured to receive the data signal over the transmission channel from the device, wherein transmission of the data signal is controlled according to a second precoding profile that matches the first precoding profile and was retrieved from a second codebook by the device.

18. The receiver of claim 16, wherein the first codebook includes a plurality of codewords, wherein each codeword includes a precoder matrix portion and a diagonal power control matrix portion to provide power control values for a plurality of streams.

19. The receiver of claim 15, wherein to quantize the first precoding value the processor is configured to generate a power control bit to control power allocation on two streams, wherein a first value of the power control bit specifies beamforming power allocation for the two streams, and a second value of the power control bit different from the first value specifies spatial multiplexing power allocation for the two streams.

20. The receiver of claim 15, wherein the precoder index includes one of:
 a first index portion indicative of a precoder matrix value and a second index portion indicative of a power allocation value;
 a first index portion indicative of a precoder matrix value, a second index portion indicative of a power allocation value, and a third index portion indicative of an adaptive modulation and coding value; or
 a quantized power control value that is used to switch between beamforming and spatial multiplexing transmissions.

* * * * *